March 15, 1932. P. C. HAMMOND ET AL 1,849,372
TWO-CYCLE INTERNAL COMBUSTION ENGINE
Filed Aug. 13, 1929    2 Sheets-Sheet 1
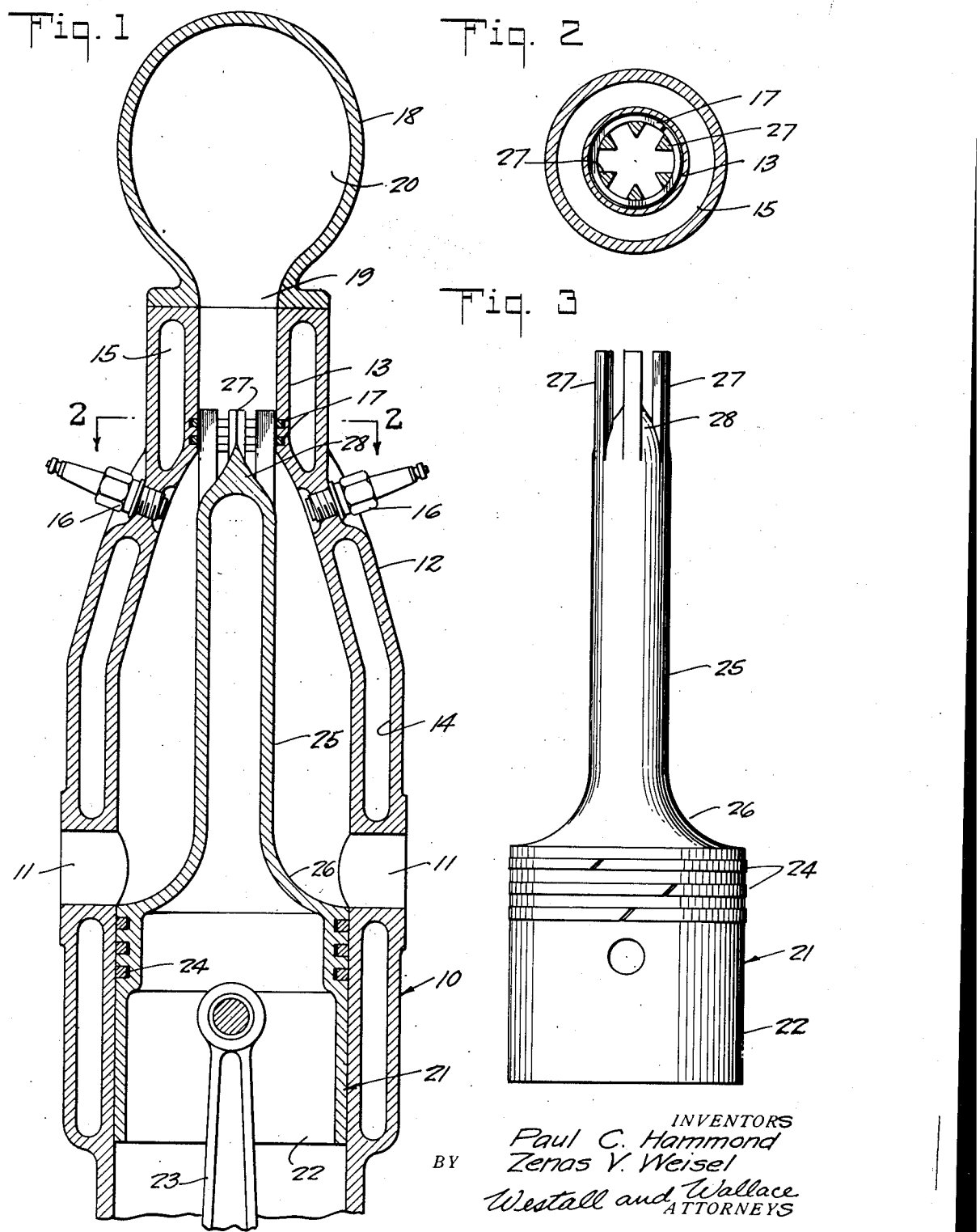
INVENTORS
Paul C. Hammond
Zenas V. Weisel
BY Westall and Wallace
ATTORNEYS

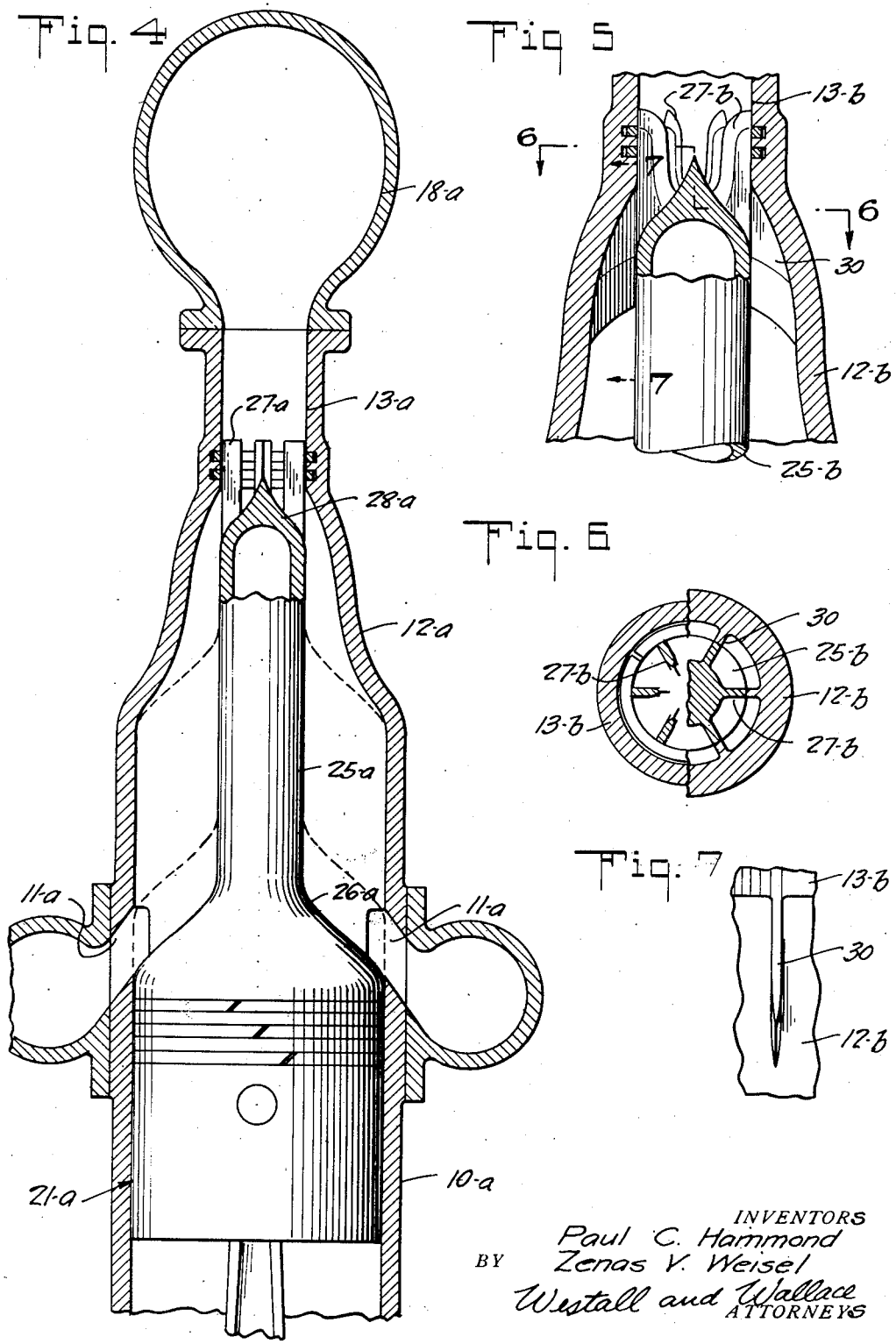

Patented Mar. 15, 1932

1,849,372

UNITED STATES PATENT OFFICE

PAUL C. HAMMOND AND ZENAS V. WEISEL, OF LOS ANGELES, CALIFORNIA

TWO CYCLE INTERNAL COMBUSTION ENGINE

Application filed August 13, 1929. Serial No. 385,529.

Our invention relates to an internal combustion engine having intake passages so designed as to efficiently convert the kinetic energy of the incoming gas into static energy.

An object of this invention is to provide an intake passage which is in effect a Venturi tube so that the kinetic energy in the constricted part due to the velocity of the entering gas will be converted into pressure or static energy without substantial loss.

Another object of this invention is to provide passages for the incoming gas which enable a substantially stream line flow thereby hindering turbulence. The present invention is especially adaptable to two cycle engines in which the incoming charge and the spent gases are in contact, and effective stratification is maintained to prevent mixture of the fresh charge with the burnt gases.

A further object of this invention is to provide an engine having a uniflow passage for gas from intake to exhaust without any damming of the burnt gas exhaust such as would create eddies, and an efficient change of the static energy at the exhaust into kinetic energy. Such action contributes to efficient scavenging of the cylinder without unnecessary loss of pressure.

Additional specific objects are first, to provide a two cycle gas engine in which the intake valve is at the top of the cylinder. The inlet valve is located preferably in the axial center of the cylinder head and the exhaust valve is preferably located in the side of the cylinder; second, to provide a two cycle internal combustion engine having an intake manifold for gas under pressure connected to the cylinder head, there being a contracted passage through the cylinder head to the cylinder and the piston having an upward extension operating through this contracted passage, such passage with the extension of the piston forming an intake valve and this functioning on the Venturi principle, giving a high velocity to the gas through the contracted part of the intake passage and allowing the subsequent expanded flow to slow up as it enters the cylinder proper with change of kinetic to static energy. The extension is preferably cylindrical and at its lower end is joined to the piston proper by a sloping surface and when the piston is in the lowest part of the stroke this surface guides the flow of the exhaust gas through the exhaust ports.

Our invention is illustrated in the accompanying drawings, in which:—

Fig. 1 is a longitudinal section through an engine of our construction; Fig. 2 is a section on the line 2—2 of Fig. 1 looking in the direction of the arrows; Fig. 3 is an elevation of the piston; Fig. 4 is an axial section through another modification of the engine; Fig. 5 is a section of a fragment having another form of guide for the piston extension; Fig. 6 is a section as seen on the line 6—6 of Fig. 5; and Fig. 7 is a fragmentary view of the structure shown in Fig. 5 as seen on the line 7—7.

Referring particularly to Figs. 1 to 3, the cylinder, designated generally by the numeral 10, has two diametrically opposite exhaust ports 11, and an upwardly tapered head end 12, whose bore diminishes in section toward the top where it merges with the bore of a sleeve like extension 13. This bore of the extension forms the throat of a Venturi passage and also a valve chamber for an intake valve. The main body of the cylinder wall is shown with a water jacket 14. There is shown also a water jacket 15 at the intake port, and on the tapered section 12 a pair of spark plugs 16 may be installed. At the lower end of the throat or intake port there are annular grooves to accommodate sealing rings 17. An intake manifold 18 is secured to the head in any suitable manner, and it will be noted that this has a contracted lower discharge end 19 and a large upper chamber 20 for the flow of the gas.

The piston, designated generally by the numeral 21 has a main body section 22, to which a connecting rod 23 is attached in the usual manner, and is provided with the usual piston rings 24. There is an upward extension 25 from the top of the piston, this being cylindrical for its main portion and having a curved sloping lower surface 26 which follows a gradual curvature to the periphery of the main body of the piston. A plurality of fingers 27 extend upwardly above the cylindrical part of the extension. These have inwardly tapered side walls being somewhat triangular in shape. There is also a coned part 28 at the upper part of the extension. The extension 25 within the sleeve 13 serves as a slide valve to open and close the intake port.

The manner of functioning of our two cycle engine shown in Figs. 1, 2 and 3 is substantially as follows:—

In the position shown in Fig. 1, the piston is at the lowest position of its stroke with the exhaust and intake ports full open. We prefer to arrange the opening and closing of the valves in the usual manner so that the intake opens at about forty-five degrees of the turn of the crank before the bottom dead center and closes about forty-five degrees after the bottom dead center is passed. The exhaust ports open preferably about sixty degrees before the bottom dead center and close sixty degrees after this is past. It will thus be seen that the exhaust ports open before the intake port or valve so that the burnt gas begins to exhaust before any of the intake gas is fed into the cylinder. As the intake gas passes from the top downwardly, it functions to force the burnt gas out of the exhaust ports without creating undue turbulence because of its stream line flow and thereby does not cause much intermixture of the intake and products of combustion.

When the piston is in its upper position, the exhaust ports are closed as is also the intake port by the extension 25. The rings 17 provide a tight seal and prevent upward blowing of the gas. It will be noted that the gas is compressed into the space between the sloping part 26 at the top of the piston proper where it joins the upward extension and the tapered part 12 of the cylinder head.

The important feature of our invention is that the intake passage functions on the Venturi tube principle. The sleeve 13 has a contracted passage or throat which is of much smaller diameter than the intake manifold chamber 20 and the cross sectional area of the head. When the intake valve is opened on the downward movement of the piston the gas will have a high velocity through this passage, there being kinetic energy of substantial amount therein. Such velocity is retarded as the gas enters the tapered head 12 and the kinetic energy due to retardation is converted into static energy. The annular space about the extension has a progressively increasing cross section in the direction of flow and of such ratio of increase as to produce an efficient Venturi effect. Efficient conversion of the kinetic to static energy is attained, and, due to lack of turbulence, stratification between the fresh charge and burnt gas is maintained.

It is to be understood that we may use a number of exhaust ports spaced on the circumference of the cylinder and that these may be of usual character having bridges between to carry the piston rings 24 of the piston and in addition we may use any ignition means expedient. An added specific feature of our invention is in the use of the sealing rings 17, these rings forming a tight seal on the extension 25 and when the intake port is full open these rings are maintained in their outwardly pressed position by the fingers 27 and thereby the rings do not cut into the cylindrical extension 25 on the upward movement of the piston.

A characteristic feature of our invention is that the intake port, together with the manifold 20, and the upper part of the cylinder when such port is opened, forms a species of Venturi tube. The gas has a flow at comparatively low speed in the intake manifold, it travels through the throat 13 at a high velocity and the velocity is gradually retarded as the gas enters the cylinder when the intake is open, thus regaining a large portion of the manifold pressure. On account of the conical shape of the upper part of the extension 25 the gas has a stream line flow through the cylinder.

As above mentioned, the exhaust ports open prior to the opening of the intake port as is common with internal combustion engines. On account of the location of the ports relative to the sloped part 26 of the extension the burnt gas has a free and stream lined passage to and out of the exhaust ports. This provides a flow without great turbulence in the exhaust, there being an added Venturi effect at the exhaust ports. The exhaust is thus reduced down to a pressure equal to or, but little above that of atmospheric pressure, depending on the efficiency of a muffler or the exhaust manifold. The intake gas, as above mentioned has a stream line flow through the cylinder and hence has little turbulence and tends to form a strata, with the burnt gases remaining in the cylinder so that the fresh charge taken into the engine mixes to a very little extent with the exploded gases. On the compression stroke this stratification is maintained and practically a pure charge without intermixture with the residue of the previous explosion is maintained. Our type of engine adds materially to the efficiency of internal combustion engine construction.

Referring particularly to Fig. 4, a cylinder 10a is shown with side exhaust ports 11a and a tapered head 12a. The bore of the head is shown with a wall to provide a variable ratio of increase of cross section as compared with length, yet limited to produce a Venturi passage in association with the piston extension 25a and the throat 13a. Parts corresponding to those shown in Fig. 1 are designated by the same reference numbers with the suffix "a". However the slope 26a at the juncture of the piston body 21a and extension 25a is designed in conjunction with the exhaust ports 11a to produce a more efficient stream line and better Venturi effect at the exhaust ports.

Referring to Figs. 5 to 7 ports corresponding to those in Fig. 1 are designated by the same reference numbers with the suffix "b" added. However, the fingers 27b are curved on their inner edges to offer a minimum of resistance to the inflowing gases and ribs 30 are provided as streamline guides. Ribs 30 are attached to the cylinder head and preferably register with the fingers 27b which may ride thereon.

The operation of the engines shown in Figs. 4 to 7 is obvious, the functioning being the same as that of the engine heretofore described. The terms "Venturi passage" and "Venturi tube" are used herein in the broad sense of a diffusing cone with a constricted throat.

What we claim is:—

1. An internal combustion engine of the character described having a cylinder provided at one end with a head formed with a Venturi passage wherein the discharge mouth of said passage forms the inner cylinder head surface and the throat of said passage an intake port for gas.

2. An internal combustion engine of the character described having a cylinder provided at one end with a head formed with a Venturi passage wherein the discharge mouth of said passage forms the inner cylinder head surface and the throat of said passage an intake port for gas, and valve means in said throat to control the flow of gas therethrough.

3. An internal combustion engine of the character described having a cylinder provided at one end with a head formed with a Venturi tube inlet wherein the discharge mouth of said tube opens into the end of said cylinder to deliver longitudinally thereof gaseous products for the working charge and the throat of said tube forms an intake port for said gaseous products, and a piston reciprocable in said cylinder and having an extension operable in said port to open and close the latter.

4. An internal combustion engine of the character described having a cylinder provided at one end with a head formed with a Venturi tube wherein the discharge mouth of said tube opens into the end of said cylinder to deliver longitudinally thereof gaseous products for the working charge and the side wall of said mouth merges with the side wall of said cylinder, and a piston reciprocable in the said cylinder having an extension operable in the throat of said Venturi tube and coacting therewith to form an inlet valve.

5. An internal combustion engine of the character described having a cylinder provided at one end with a head formed with a Venturi tube wherein the discharge mouth of said tube forms the inner cylinder head surface and the throat an intake port, and a piston reciprocable in said cylinder having an extension reciprocable in said port and coacting with said throat to form a piston valve.

6. An internal combustion engine of the character described having a cylinder provided at one end with a head formed with a Venturi tube inlet wherein the discharge mouth of said tube opens into the end of said cylinder to deliver longitudinally thereof gaseous products for the working charge and the throat of said tube forms an intake port for said gaseous products, exhaust ports in the side of said cylinder, and a piston reciprocable in said cylinder and having an extension operable in said port to open and close the latter, said extension having a sloping surface merging with said piston to form a stream line passage for exhaust gases to said exhaust ports.

7. An engine comprising in combination a cylinder having an exhaust port at one side and a head with a contracted passage in axial alinement with the cylinder, a piston having the main body bearing against the cylinder and controlling the exhaust port, an upward extension from the piston having a cylindrical part slidable in the said passage, and a plurality of spaced fingers on said extension, said fingers bearing against the passage and allowing flow of intake gas, the upper end of the extension having a conoidal structure extending into the space between the said fingers, said conoidal structure guiding the intake gas towards the sides of the cylinder.

8. An engine comprising in combination a cylinder having an exhaust port in the side, an internally conical head with the base towards the cylinder, with a cylindrical contracted passage in axial alinement with the cylinder, an intake manifold connected to said passage, a piston having a main body contacting with the cylinder wall and controlling the exhaust port, an upward extension having a cylindrical portion, said cylindrical portion being joined to the body of the piston by outwardly concave curved surfaces, the extension having a conoidal end having the apex up and with guide fingers extending upwardly, said fingers being spaced apart and having a recess between said fingers to allow flow of gas through the said passage into the cylinder, the said fingers engaging the cylindrical passage when the piston is at its lowermost position and the conical upper part of the extension guiding the gas towards the sides of the cylinder.

9. An engine comprising in combination a cylinder having a pair of exhaust ports on opposite sides, a head internally shaped as a frustum of a cone with the apex up and with a cylindrical contracted passage connected thereto forming an intake port, a piston having a main body sliding in the cylinder and controlling the exhaust ports, an extension upwardly from the piston having spaced fingers at its upper end engaging in said passage, the said extension having an upwardly and inwardly tapered top between the fingers, the slope of the said top being substantially the same as that of the head of the cylinder, the said fingers having a central recess to allow flow of the intake gas downwardly, said gas impinging on the sloping top of the extension and being guided in a flow parallel to the slope of the head of the cylinder.

10. An engine comprising in combination a cylinder having an exhaust port, a cylinder head shaped internally as a frustum of a cone with the apex up and a passage extending from said apex in axial alinement with the cylinder and forming an intake port, a piston slidable in the cylinder and controlling the exhaust port, said piston having an upward extension with a conoidal shaped upper end with the apex up, the slope of the cone of the extension being substantially similar to the slope of the frustum of the cone of the cylinder head, and means connected with the said extension and operable in the said passage to guide the said extension.

In witness that we claim the foregoing we have hereunto subscribed our names this 3rd day of August, 1929.

PAUL C. HAMMOND.
ZENAS V. WEISEL.